March 7, 1944.    H. M. AUSTIN    2,343,839
FLEXIBLE COUPLING
Filed Jan. 11, 1941
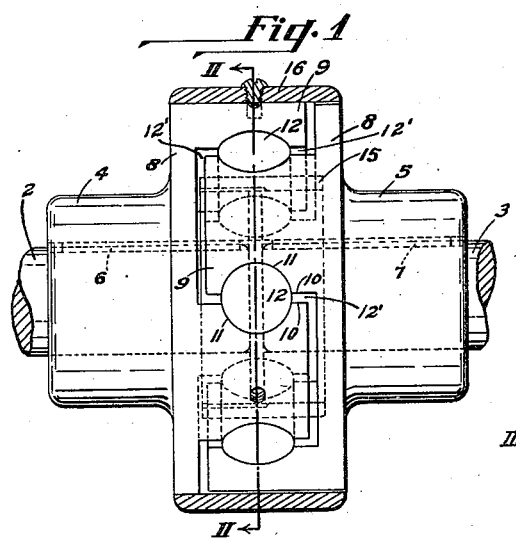
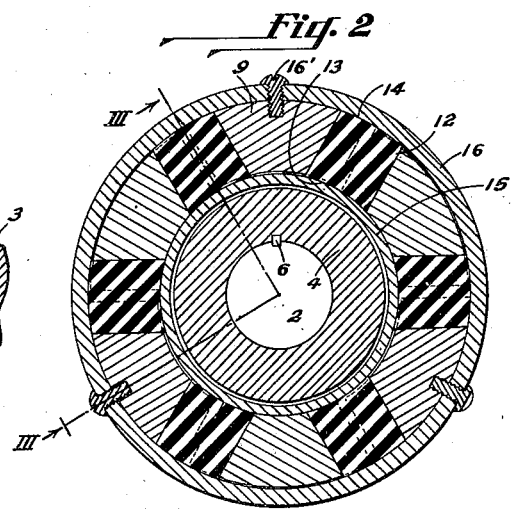
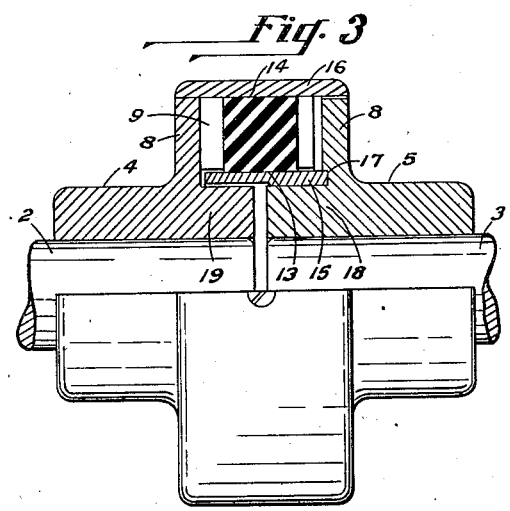
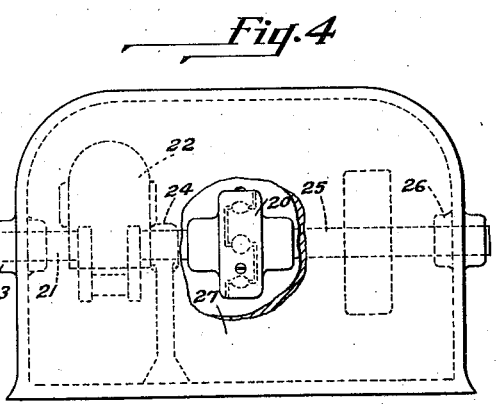
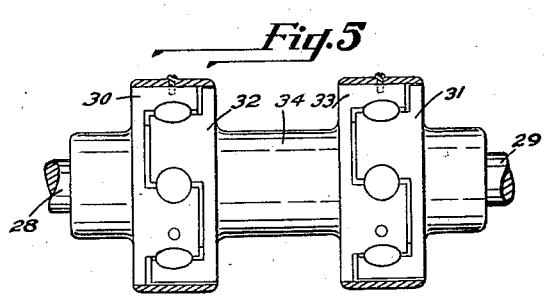
Inventor
Harry M. Austin
by
Walter F. Kaufman
Attorney Patented Mar. 7, 1944

2,343,839

UNITED STATES PATENT OFFICE 2,343,839

FLEXIBLE COUPLING

Harry M. Austin, East Petersburg, Pa., assignor to Armstrong Cork Company, Lancaster, Pa., a corporation of Pennsylvania Application January 11, 1941, Serial No. 374,064

4 Claims. (Cl. 64—14)

This invention relates particularly to flexible couplings.

The flexible coupling of the invention is particularly adapted to provide a connection between the driving and driven members of such motor-generator or engine-generator sets generally referred to as single-outer-bearing coupled-unit sets, wherein it is necessary for the coupling to take part of the weight of one of the devices coupled as well as to transmit the torque from the driving unit to operate the driven unit and at the same time to maintain alignment between the shafts of the two units of the set. The flexible coupling of the invention is adaptable to all kinds and sizes of such sets varying from small units run by gasoline engines and operating generators for lighting rural farms to units on the order of from 60 to 80 feet in overall length employing Diesel engines for developing the electric power for running modern streamliner trains. The coupling is also adapted for use as a universal coupling as will be described hereinbelow.

In the drawing, illustrative of the invention,

Figure 1 is a side elevation of the coupling with the outer sleeve cut away;

Figure 2 is a vertical cross section of the coupling taken on line II—II of Figure 1;

Figure 3 is a side elevation of the device in partial section taken on the lines III—III of Figure 2;

Figure 4 is a diagrammatic view in side elevation, partly cut away, illustrating one use of the device; and Figure 5 is a view illustrating a modified arrangement adapting the device for use as a universal coupling.

Figures 1 to 3 illustrate the coupling device itself connecting a driving shaft 2 and a driven shaft 3. The driving shaft 2 may be that of any conventional motor or engine while the driven shaft 3 may be that of any conventional machine such as a generator or pump. The device itself comprises two hubs 4 and 5, one for each shaft to be connected, to which they are slidably fitted by the keys 6 and 7 respectively. Each hub is integral with a flange 8 with laterally extending teeth 9, the set of teeth of one flange meshing with the set of teeth on the other flange with clearance therebetween. The opposed faces 10 of the teeth 9 are provided with substantially semi-cylindrical recesses 11 each of which extends radially through the entire face of its respective tooth as shown clearly in Figure 2. The spaces formed by the recesses receive resilient members 12 which are of a circular cross-section and are provided with a concave inner end 13 and a convex outer end 14 to conform with an inner sleeve 15 frictionally fixed upon hub 5 and an outer sleeve 16 fastened by screws 16' to the teeth of the other hub 4 respectively. It should be noted that the inner sleeve 15 fits within an annular slot 17 formed between the inwardly exing portion 18 of the hub 5 and the teeth on said hub while there is a slight clearance between the inner sleeve and the inwardly extending portion 19 of the other hub 4 and the teeth projecting from the other hub as clearly shown in Figure 3. Similarly, the teeth and the flange of the hub 5 are made so that there is a clearance between them and the outer sleeve 16 fastened to the teeth of the outer hub 4.

Obviously, the resilient members or blocks may have other cross-sectional shapes, such as square, rectangular, elliptical, etc.

In assembling the coupling device, it is preferred to pre-load it. This is done by fastening the inner sleeve 15 within its annular groove or seat on hub 5, sliding the respective hubs upon their corresponding shafts with the keys 6 and 7 in place, slipping the outer sleeve 16 over one of the shafts to one side of its proper location, bringing the teeth of the respective coupling members into intermeshing position, inserting all but one of the resilient members 12 into their proper positions, and slightly rotating the hubs in different directions to spread wider the teeth forming the remaining unfilled opening to enable the insertion of the final resilient member therein. The resilient members or blocks employed in assembling the device are all of the same size, but when not compressed, they are slightly larger than the openings between the several teeth when the two coupling members are placed in alignment with respect to their interlocking teeth. Of course, it is necessary to fasten the outer sleeve in proper position to the teeth on hub 4 to complete the coupling. The extent of pre-loading can be predetermined by selecting resilient members of larger or smaller size respectively depending upon whether greater or less pre-loading is desired.

The extent of pre-loading as well as the resiliency of the several resilient members determines the flexibility or rigidity of the coupling. These members may be made of rubber or synthetic rubbers, such as polymerized chloroprene, isoprene, butadienes, and so forth.

In Figure 4, there is illustrated one of the uses to which the flexible coupling is especially adapted. In this figure, the flexible coupling 20 is shown connecting the crank shaft 21 of an engine 22, such as a Diesel engine, supported on bearings 23 and 24 with a rotatable member 25, such as an armature of a generator, supported by the single outer bearing 26, the engine and generator being housed in a single casing 27.

In the arrangement shown in Figure 4, there are no bearings between the coupling and the generator. It is, therefore, necessary that the flexible coupling take considerable load from the generator. By suitably proportioning the resilient blocks and by selecting them of the proper resiliency, the coupling can be successfully applied in the above-described arrangement very satisfactorily. In this arrangement, it should be noted that the coupling maintains the driving and the driven shafts in substantial alignment. The greater the torque, the greater is the stabilizing force tending to maintain the two shafts in alignment. This is the result of the fact that as greater torque is applied, the resilient blocks are compressed laterally which compression results in expansion in a direction radially of the coupling, with a consequent greater resistance to radial forces between the inner and outer sleeves fastened to the respective hubs. The increase of the radial pressure exerted by the resilient blocks upon increase of lateral pressure corresponding to an increase of torque results from the substantially complete confinement of the resilient blocks laterally (except for the narrow openings 12' on opposite sides of each block corresponding to the clearance between the respective teeth on the two hubs). The resilient blocks, as applied in the device, act efficiently to absorb shock and irregular motion, such as result when internal combustion motors are employed. Any axial thrust or movement is permitted by the sliding of either shaft relative to the hub of one of the coupling members along the keyway. The flexible coupling in a similar arrangement is adapted to connect marine engines to floating propeller shafts. In this arrangement, the coupling takes some of the weight of the propeller shaft, the inboard end of which is free of any rigid bearing.

The device may also be used for coupling shafts which are slightly out of alignment, but in this case it is not advisable to subject the coupling to any of the weight of the devices coupled unless the misalignment between the shafts be small. The angularity of misalignment which the coupling is adapted to take care of is limited by the clearance between the inner and outer sleeves and the teeth of the two coupling members. By increasing the clearances referred to, the device can take care of greater angularity between the two shafts. However, an alternative arrangement is shown in Figure 5, where two shafts 28 and 29 having greater angularity with respect to each other than could be taken care of by a single flexible coupling are connected by means of two such couplings 30 and 31. As shown in Figure 5, one of the jaw members 32 of one of the couplings is connected to the complementary jaw member 33 of the other coupling by means of a single hub 34, within which it is not necessary to have a shaft. Alternatively, the single hub joining the complementary members of the two coupling devices may be replaced by a shaft of any desired length upon each end of which the proper jaw member of each coupling device is keyed or otherwise fastened. The double coupling arrangement can also be used in coupling marine engines to propeller shafts which have a fixed inboard bearing substantially at the point of coupling and which are somewhat out of alignment.

Obviously, the coupling can be used for joining a take-off shaft of any driving device, such as motor, engine, etc., to the take-on shaft of any device to be driven, such as a generator, pump, fan, propeller, etc. This is true regardless of whether the device is used in an arrangement wherein it has to take part of the weight of the driving device or the driven device or both or in an arrangement wherein it does not have to take such weight.

The preceding description of the device is to be considered descriptive only. It is obvious that various modifications of parts or arrangements or shapes of parts may be made to accomplish the essential purposes of the device, and therefore, the invention is to be limited only by the appended claims.

I claim:

1. A flexible coupling comprising two coupling members adapted to connect two shafts having a substantially common axis; a plurality of substantially complementary interfitting teeth projecting from said two coupling members with a clearance between the opposed surfaces of said teeth; a sleeve member on one of said coupling members; a sleeve on the other of said coupling members, each of said sleeve members being normally free for limited axial and radial movement with respect to the other coupling member, respectively; and a plurality of resilient members substantially symmetrically radially arranged about said axis and extending between said teeth, one of said sleeve members engaging the inner end surfaces of said resilient members and the other of said sleeve members engaging the outer end surfaces of said resilient members, and said resilient members being disposed under compression between said sleeve members.

2. A flexible coupling comprising two coupling members adapted to connect two shafts having a substantially common axis; a plurality of substantially complementary interfitting teeth projecting from said two coupling members with a clearance between the opposed surfaces of said teeth, each of said opposed tooth surfaces having a radially extending recess formed therein; a sleeve member on one of said coupling members; a sleeve member on the other of said coupling members, each of said sleeve members being normally free for a limited axial and radial movement with respect to the other coupling member, respectively; and a plurality of preloaded resilient members substantially symmetrically radially arranged about said axis and disposed in said recesses between said teeth, one of said sleeve members engaging the inner end surfaces of said resilient members and the other of said sleeve members engaging the outer end surface of said resilient members, and said resilient members being disposed both under compression between said sleeve members and under compression between said teeth.

3. A flexible coupling as claimed in claim 2 in which said resilient members are substantially cylindrical; and said recesses are substantially semi-cylindrical so that said cylindrical resilient members are substantially completely enclosed except for the restricted lateral area of each of the resilient members between the opposed surfaces of said teeth and so that each of said resilient members is only capable of limited lateral flow at said restricted area.

4. A flexible coupling comprising two coupling members adapted to connect and to transmit torque from a driving shaft to a driven shaft having a substantially common longitudinal axis; a plurality of substantially complementary interfitting teeth projecting from said two coupling members with a clearance between the opposed surfaces of said teeth, each of said opposed tooth surfaces having a radially extending recess formed therein; a sleeve member on one of said coupling members; a sleeve member on the other of said coupling members, each of said sleeve members being normally free for a limited axial and radial movement with respect to the other coupling member, respectively; and a plurality of pre-loaded resilient members substantially symmetrically radially arranged about said axis and between said teeth and under pressure in said recesses, one of said sleeve members engaging the inner end surfaces of said resilient members and the other of said sleeve members engaging the outer end surfaces of said resilient members, said resilient members being disposed under compression between said sleeve members, and said resilient members being so confined between said teeth and said sleeves that an increase in torque results in an increase of the resistance of said resilient members to radial compression and an increase in the tendency of said resilient members to prevent transverse movement of said coupling members relatively of each other.

HARRY M. AUSTIN.

CERTIFICATE OF CORRECTION.

Patent No. 2,343,839. March 7, 1944.

HARRY M. AUSTIN.

It is hereby certified that error appears in the printed specification of the above numbered patent requiring correction as follows: Page 1, second column, line 9-10, for "exing" read --extending--; and that the said Letters Patent should be read with this correction therein that the same may conform to the record of the case in the Patent Office.

Signed and sealed this 9th day of May, A. D. 1944.

(Seal)

Leslie Frazer
Acting Commissioner of Patents.